(12) United States Patent
Maguire et al.

(10) Patent No.: US 8,887,667 B2
(45) Date of Patent: Nov. 18, 2014

(54) LITTER BOX HAVING SUPPORT ELEMENTS WHICH SUPPORT LITTER ABOVE A FLOOR HAVING A DRAIN LOCATED THEREIN

(76) Inventors: Sara Maguire, Seal Rock, OR (US); Walt Maguire, Seal Rock, OR (US)

(*) Notice: Subject to any disclaimer, the term of this patent is extended or adjusted under 35 U.S.C. 154(b) by 1519 days.

(21) Appl. No.: 12/231,156

(22) Filed: Aug. 28, 2008

(65) Prior Publication Data

US 2010/0050951 A1    Mar. 4, 2010

(51) Int. Cl.
*A01K 29/00* (2006.01)
*A01K 1/01* (2006.01)

(52) U.S. Cl.
CPC .................................. *A01K 1/0107* (2013.01)
USPC ......................................... 119/166; 119/165

(58) Field of Classification Search
USPC ......................................... 119/161, 165–170
IPC ....................................................... A01K 29/00
See application file for complete search history.

(56) References Cited

U.S. PATENT DOCUMENTS

| | | | | |
|---|---|---|---|---|
| 5,289,800 A | * | 3/1994 | Walton | 119/166 |
| 5,353,743 A | * | 10/1994 | Walton | 119/166 |
| 5,355,837 A | * | 10/1994 | Reyes | 119/161 |
| 5,579,722 A | * | 12/1996 | Yamamoto et al. | 119/169 |
| 5,797,352 A | * | 8/1998 | Ebert | 119/652 |
| 6,357,388 B1 | * | 3/2002 | Holtrop et al. | 119/28.5 |
| 6,408,790 B1 | | 6/2002 | Maguire | |
| 6,523,495 B1 | | 2/2003 | Rydman | |
| 6,994,054 B2 | | 2/2006 | Natsuo et al. | |
| 7,107,933 B2 | * | 9/2006 | Mohr | 119/166 |
| 7,584,717 B2 | * | 9/2009 | Skovron et al. | 119/165 |
| 2007/0068461 A1 | * | 3/2007 | Hill | 119/166 |

* cited by examiner

*Primary Examiner* — David Parsley
(74) *Attorney, Agent, or Firm* — Chernoff Vilhauer LLP

(57) ABSTRACT

A litter box has upstanding sidewalls which form an enclosure. A floor located in the enclosure extends between the sidewalls. The floor slopes downwardly from the sidewalls to a drain opening. A plurality of support elements project upwardly from the floor at spaced-apart locations. The size of the support elements and the distance between them are such that substantially all of the litter placed in the litter box is supported on top of support elements above the floor.

28 Claims, 4 Drawing Sheets

LITTER BOX HAVING SUPPORT ELEMENTS WHICH SUPPORT LITTER ABOVE A FLOOR HAVING A DRAIN LOCATED THEREIN

BACKGROUND OF THE INVENTION

For environmental reasons it is desirable to extend the length of time litter can be used in a pet litter box before it must be discarded. One way of accomplishing this is to have the urine pass through the litter into a tray which can be removed from the litter box and emptied rather than having the urine remain in the litter. In the past this has been accomplished by placing the litter on a screen which is located above a sloped floor which collects the urine that passes through the litter and the screen and causes it to flow through an opening into the tray. An example of such a litter box is Maguire, U.S. Pat. No. 6,408,740. However, because the litter is in direct contact with the screen and the screen has small openings, surface tension prevents some of the urine from passing through the screen. Rydman, U.S. Pat. No. 6,523,495, attempts to correct this problem by placing downwardly depending disbursing nibs at the intersection of the rows and columns of the elements in the screen. However, urine still remains in the litter.

BRIEF SUMMARY OF THE INVENTION

The subject invention overcomes the shortcomings of the prior art litter boxes by providing a plurality of support elements which project upwardly from the floor at spaced-apart locations. The size of the support elements and the distance between them are such that substantially all of the litter particles are supported on the support elements above the floor.

The foregoing and other objectives, features, and advantages of the invention will be more readily understood upon consideration of the following detailed description of the invention, taken in conjunction with the accompanying drawings.

DETAILED DESCRIPTION OF PREFERRED EMBODIMENT

Figure 1:
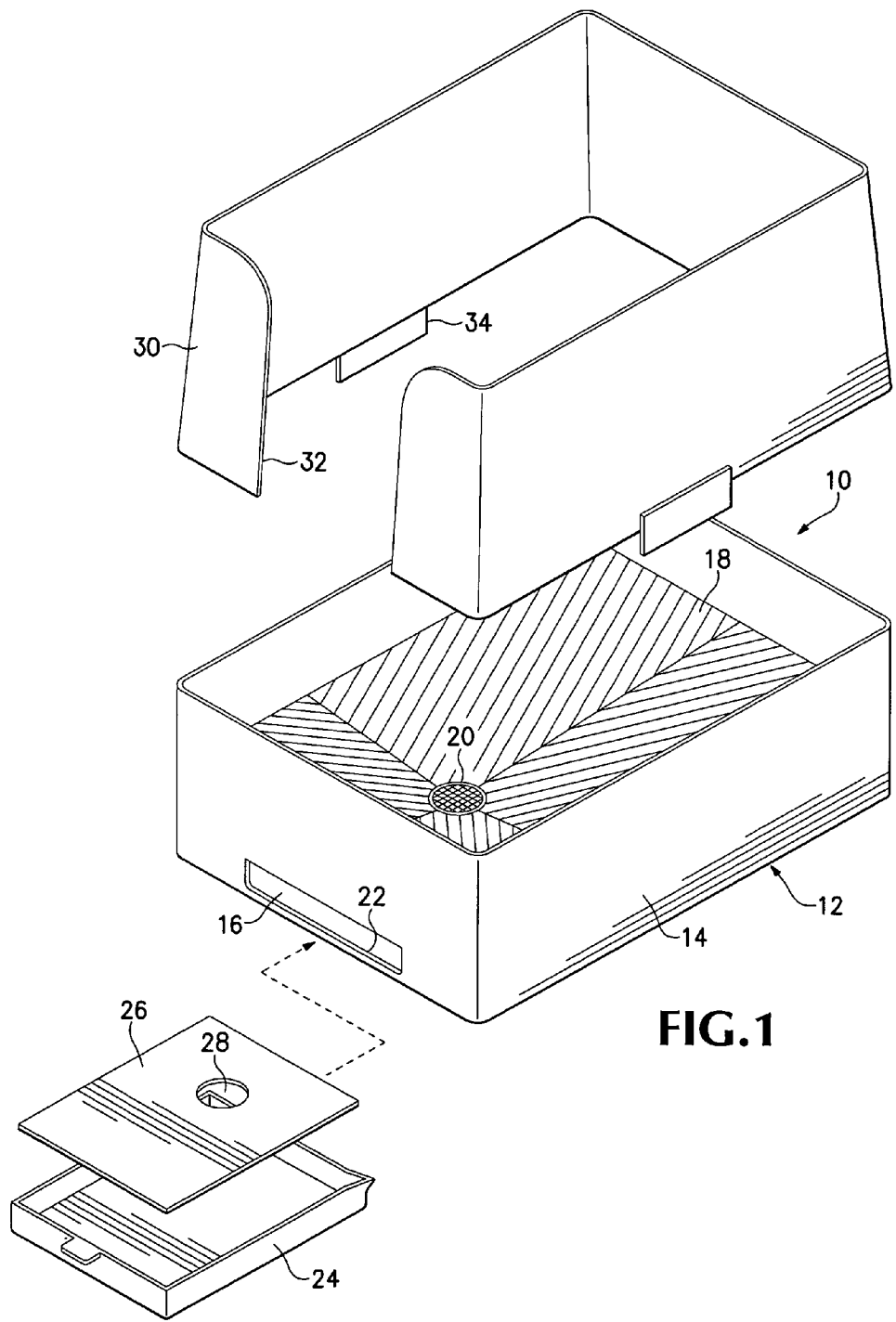
FIG. 1 is an exploded perspective view showing a pet litter box embodying the subject invention.
Figure 2:
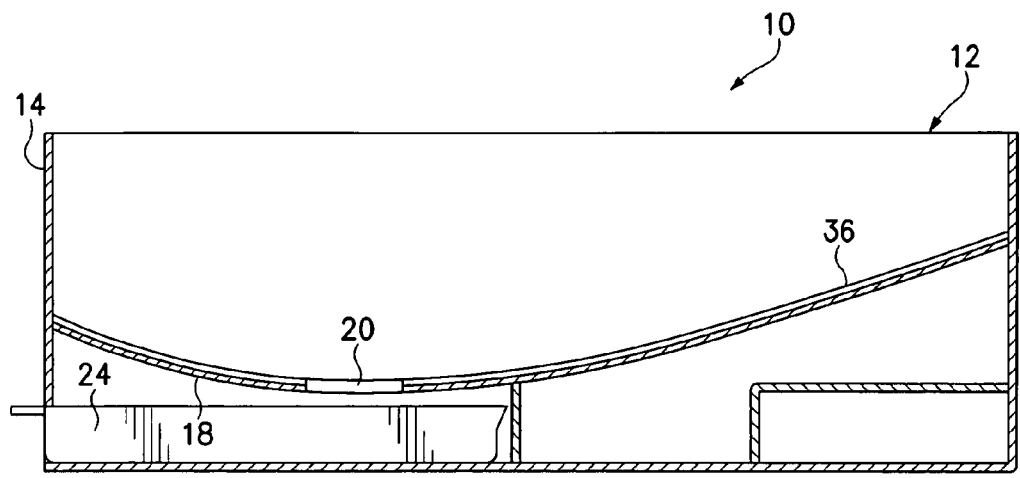
FIG. 2 is a longitudinal sectional view of the litter box shown in FIG. 1.
Figure 3:
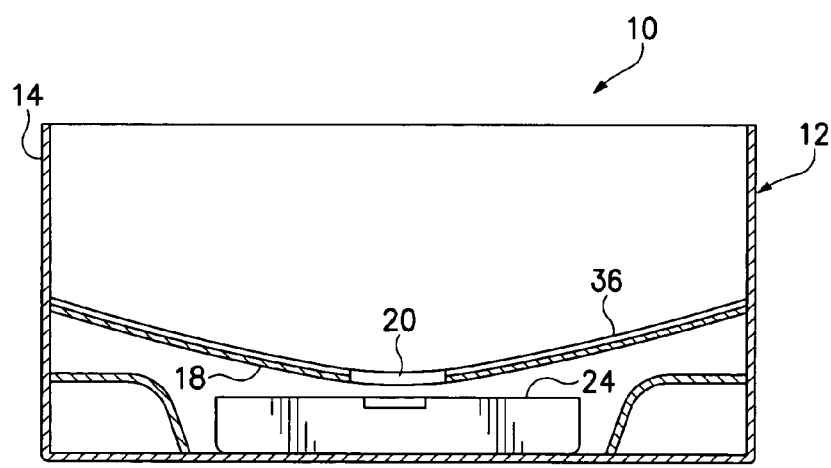
FIG. 3 is a traverse sectional view of the litter box shown in FIG. 1.

Referring now to FIG. 1, a pet litter box 10 includes a base 12. The base 12 is preferably rectangular in cross section and has sidewalls 14 which extend upwardly from a bottom element 16. A floor 18 extends between the sidewalls above the bottom element. Preferably the base is made from a plastic material and is an integral unit. Referring now to FIGS. 2 and 3, the floor curves downwardly from the sidewalls to a drain opening 20. The drain opening has a mesh pattern which allows liquid to flow through the floor but prevents solids from passing through it. A slot 22 located in one of the sidewalls 14 is sized to slidably receive an open topped tray 24. The slot 22 is located in the floor such that the tray is above the drain opening. A lid 26 can be provided for the tray if desired. The lid 26 has an opening 28 which is aligned with the drain opening 20 in the floor when the tray is fully inserted into the slot 22.

A wall 30 having an entry 32 can be placed above the litter box to give pets using the litter box privacy. The wall 30 attaches to the sidewall by attachment means, such as deformable tabs 34.

Figure 4:
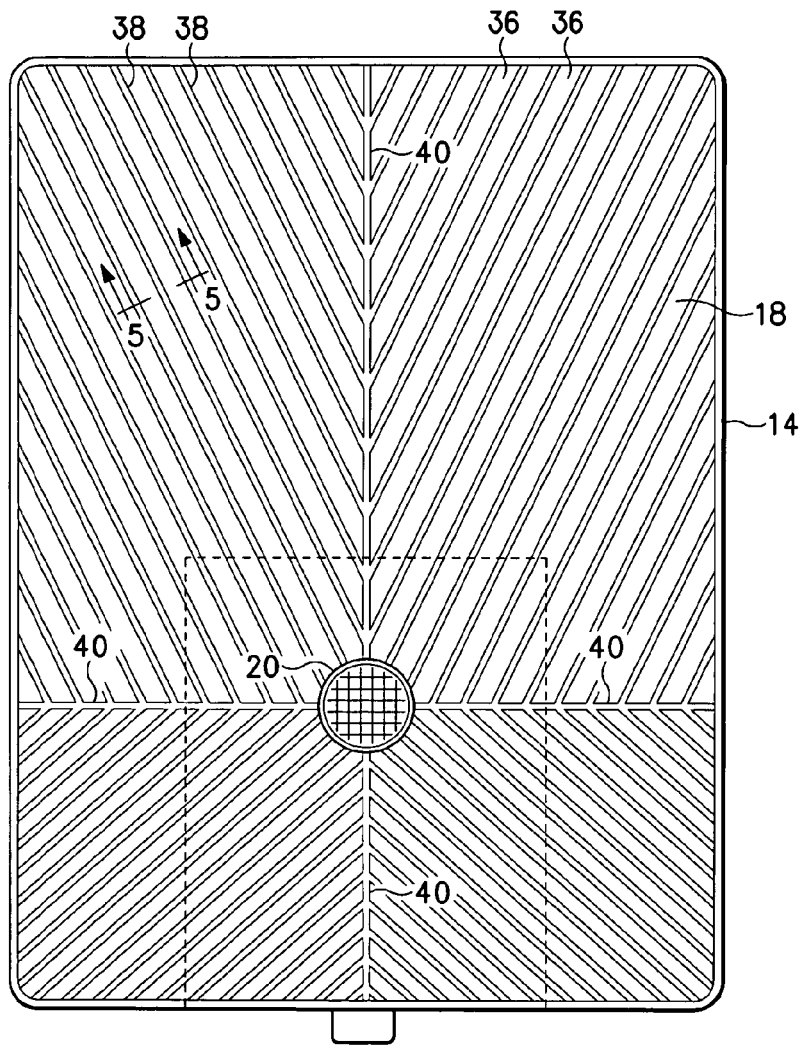
FIG. 4 is a plan view of the litter box.

Located on the floor are a series of support elements which are configured to hold non-absorbent litter 35 placed in the litter box above the floor 18. The support elements also direct urine which passes through the litter to flow along the floor to the drain opening 20. In the embodiment illustrated in FIGS. 4-6, the support elements are a series of raised ribs 36 which create a series of passageways 38 between them. In a preferred embodiment the ribs are arranged in parallel side-by-side rows and a passageway is formed between each adjacent pair of ribs. The ribs are oriented so they extend from the sidewalls downwardly along the slope of the floor. With a rectangular base 12 this means that only a portion of the passageways open directly into the drain opening 20. In order to make urine deposited into all of the passageways flow to the drain opening, the ribs are arranged such that the lower extremities of the passageways that do not open directly into the drain opening terminate at the lower extremity of another passageway. However, the lower extremities of opposing ribs do not touch one another so channels 40 are formed between them. In the embodiment illustrated there are four channels 40 which extend from the four sidewalls and each channel bisects the sidewall it extends from and opens into the drain opening 20. Thus the channels extending from opposed sidewalls are aligned with one another. The ribs are arranged in a herringbone pattern and are arranged such that the passageways 38 that extend from each corner of the base open directly into the drain opening 20.

Figure 5:
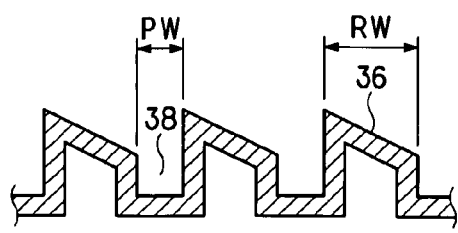
FIG. 5 is a sectional view taken on line 5-5 of FIG. 4.
Figure 6:
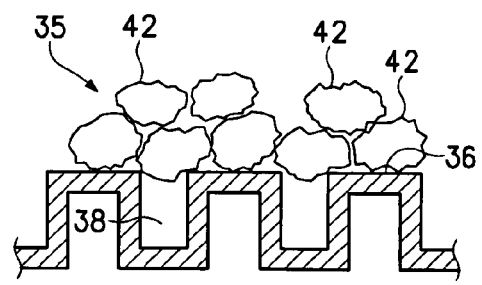
FIG. 6 is a sectional view similar to FIG. 5 of another embodiment of the invention.
Figure 7:
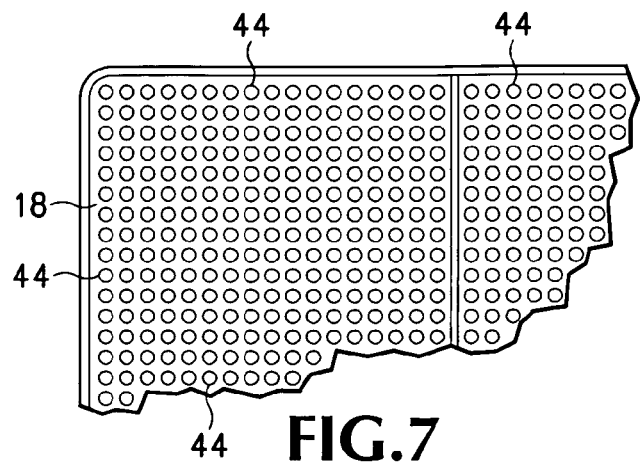
FIG. 7 is a plan view of another embodiment of the invention.
Figure 8:
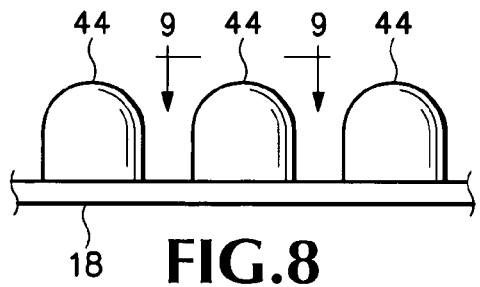
FIG. 8 is a detail view showing the fingers in FIG. 7.
Figure 9:
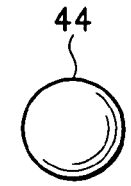
FIG. 9 is a view taken on line 9-9 of FIG. 8.
Figure 10:
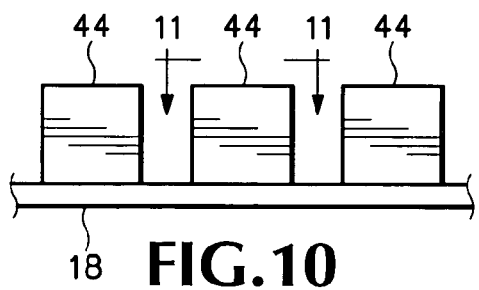
FIG. 10 is a detail view similar to FIG. 8 of another embodiment of the invention.
Figure 11:
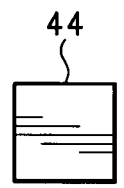
FIG. 11 is a view taken on line 11-11 in FIG. 10.
Figure 12:
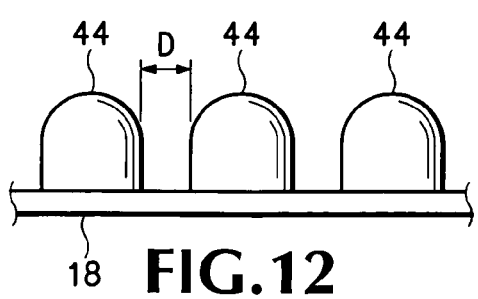
FIG. 12 is a detail view similar to FIG. 8 of another embodiment of the invention.

The ribs preferably are rectangular in cross section and have a flat top, that either is substantially horizontal when the base is placed on a horizontal surface, FIG. 6, or is sloped with respect to the horizontal FIG. 5. The ribs preferably have a rib width "RW" which is between $1/16^{th}$ inch and $3/8^{th}$ inch and in a preferred embodiment is $3/16^{th}$ inch. There also is a passageway width "PW" which preferably is between $1/32^{nd}$ inch and $1/4$ inch, and preferably is $3/32^{nd}$ inch. While the height of the ribs is not critical, it has been found that a height of around $1/8^{th}$ inch works well. The litter box is intended to be used with non-absorbent litter. Most non-absorbent litter has particles 42 which are large enough that substantially all of the particles are supported by the ribs 36 above the floor 18, and the passageways are still large enough that urine passing through the litter will flow rapidly to the drain opening 20.

Figure 13:
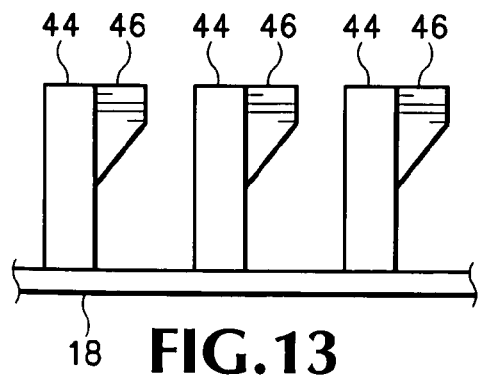
FIG. 13 is a detail view similar to FIG. 8 of yet another embodiment of the invention.

Referring now to FIG. 13, by having the ribs wider at their top than at their bottom, the effective passageway width for purposes of rapidly moving urine to the outlet 20 can be increased, without increasing the passageway width with respect to the ability of the ribs to support litter particles 42 above the floor 18. In the embodiment illustrated, this is accomplished by extending one side of the top portion 46 of each rib 44 outwardly toward the adjacent rib. In the embodiment illustrated, this top portion is in the shape of a truncated triangle, but other shapes would work as, well.

Referring now to FIGS. 7-12, rather than having ribs 36 and the resulting passageways 38, the support elements can be a plurality of elongate fingers 44 which project upwardly from the floor 18. The fingers are separated from one another by distance "D." The distance "D" preferably is between $1/32^{nd}$ inch and $1/4$ inch, and preferably is $3/32^{nd}$ inch. As with the ribs, the height of the fingers is not critical. In a first embodiment shown in FIGS. 8 and 9, the fingers 44 are circular in cross section and have a domed upper extremity. In an alternative embodiment, shown in FIGS. 10 and 11, the fingers are square in cross section and have a flat top. The square fingers also could have domed tops if desired, FIG. 12. The fingers could have any shape in cross section so long as they are generally symmetrical around their longitudinal axis. Any polygonal shape would fit within that criterion. In either case the size of the fingers and the distance they are separated from one another is such that substantially all of the litter 35 placed in the litter box is supported by the fingers above the floor 18.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A litter box comprising:
    (a) a base having upstanding sidewalls which form an enclosure, and a floor which extends between said sidewalls;
    (b) a drain opening located in said floor, and said floor sloping downwardly from said sidewalls to said drain opening;
    (c) a plurality of support elements which project upwardly from said floor at spaced apart locations;
    (d) said support elements having a top;
    (e) said support elements being spaced apart from one another such that there is a passageway width between the tops of adjacent support elements;
    (f) said support elements comprise a plurality of elongate fingers which extend upwardly from said floor, said fingers having tops which are separated from one another by a predetermined distance;
    (g) litter, having a plurality of discrete particles having specific dimensions, said litter being placed in said base, directly on top of said support elements; wherein
    (h) said specific dimensions of substantially all of said particles are greater than said passageway width so that substantially all of said particles are supported by said support elements above said floor.

2. The litter box of claim 1 wherein said support elements comprise:
    a. A plurality of raised ribs projecting upwardly from said floor, said ribs arranged to form a passageway between adjacent one of said ribs;
    b. A plurality of channels, separate from said passageways, each of said channels extending between one of said sidewalls and said drain opening; wherein
    c. Each of said passageways opens into one of said channels or into said drain opening.

3. The litter box of claim 1 wherein said support elements comprise a plurality of elongate fingers which extend upwardly from said floor, said fingers having tops which are separated from one another by a predetermined distance.

4. The litter box of claim 2 wherein said sidewalls form an enclosure which is rectangular in cross section.

5. The enclosure of claim 4 wherein there are four channels and the channels which extend from opposed ones of said sidewalls are aligned with one another.

6. The litter box of claim 2 wherein said ribs have an upper surface which is substantially horizontal when said base is placed on a substantially horizontal surface.

7. The litter box of claim 2 wherein said ribs have an upper surface which is sloped with respect to the horizontal when said base is placed on a substantially horizontal surface.

8. The litter box of claim 2 wherein said ribs are rectangular in cross-section and have a rib width and height.

9. The litter box of claim 8 wherein said rib width is between $1/16$th inch and $3/8$th inch.

10. The litter box of claim 8 wherein said rib width is $3/16$th inch.

11. The litter box of claim 2 wherein said passageway width is between $1/32$nd inch and $1/4$ inch.

12. The litter box of claim 2 wherein said passageway width is $3/32$nd inch.

13. The litter box of claim 2 wherein said rib has a rib width and said rib width varies over the height of said ribs.

14. The litter box of claim 13 wherein said rib width is larger at the top of said ribs than proximate the bottom of said ribs.

15. The litter box of claim 1 wherein said fingers are circular in cross-section.

16. The litter box of claim 15 wherein said fingers have an upper extremity which is dome-shaped.

17. The litter box of claim 15 wherein said fingers have a diameter which is between $1/16$th inch and $3/8$th inch.

18. The litter box of claim 15 wherein said fingers have a diameter which is $3/16$th inch.

19. The litter box of claim 1 wherein said fingers are square in cross-section.

20. The litter box of claim 19 wherein said fingers have an upper surface which is planar.

21. The litter box of claim 20 wherein said upper surface is substantially horizontal when said base is placed on a substantially horizontal surface.

22. The litter box of claim 20 wherein said upper surface is sloped with respect to the horizontal when said base is placed on a substantially horizontal surface.

23. The litter box of claim 19 wherein said fingers have a width which is between $1/16$th inch and $3/8$th inch.

24. The litter box of claim 19 wherein said fingers have a width which is $3/16$th inch.

25. The litter box of claim 1 wherein said fingers have a height which is between $1/8$th inch and $1/4$ inch.

26. The litter box of claim 1 wherein said fingers have a height which is $1/8$th inch.

27. The litter box of claim 1 wherein said fingers are separated from one another by a distance which is between $1/32$nd inch and $1/4$ inch.

28. The litter box of claim 1 wherein said fingers are separated from one another by a distance which is $3/32$nd inch.

* * * * *